(12) United States Patent
Murrin

(10) Patent No.: US 10,050,811 B2
(45) Date of Patent: Aug. 14, 2018

(54) DETERMINING SIGNAL CHANNEL IMPULSE RESPONSE USING SUBCARRIER PILOT SIGNALS

(71) Applicant: Imagination Technologies Limited, Kings Langley (GB)

(72) Inventor: Paul Murrin, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/505,674

(22) Filed: Oct. 3, 2014

(65) Prior Publication Data

US 2015/0110207 A1 Apr. 23, 2015

(30) Foreign Application Priority Data

Oct. 17, 2013 (GB) .................................. 1318371.0

(51) Int. Cl.
*H04L 25/02* (2006.01)
*H04L 27/26* (2006.01)

(52) U.S. Cl.
CPC ...... *H04L 25/0212* (2013.01); *H04L 25/0232* (2013.01); *H04L 27/2613* (2013.01); *H04L 27/2647* (2013.01); *H04L 27/2665* (2013.01)

(58) Field of Classification Search
CPC ............. H04L 27/2647; H04L 25/0232; H04L 27/2695; H04L 25/0212
See application file for complete search history.

(56) References Cited

U.S. PATENT DOCUMENTS

| | | | |
|---|---|---|---|
| 8,340,234 B1 * | 12/2012 | Cheng et al. | 375/348 |
| 2005/0135509 A1 | 6/2005 | Mantravadi et al. | |
| 2005/0213679 A1 | 9/2005 | Yamagata | |
| 2007/0160159 A1 * | 7/2007 | Song | H04L 25/0232 375/260 |
| 2007/0230601 A1 * | 10/2007 | Yim | H04L 5/0048 375/260 |

(Continued)

*Primary Examiner* — Patrick Edouard
*Assistant Examiner* — Eboni Hughes
(74) *Attorney, Agent, or Firm* — Vorys, Sater, Seymour and Pease LLP; Vincent M DeLuca

(57) ABSTRACT

Distortion caused by spurious components in a determined channel impulse response (CIR) is reduced. In an OFDM (orthogonal frequency-division multiplexing) system pilot signals are applied to different subcarriers of different symbols in accordance with a pilot transmission scheme. Channel estimates are determined by time-interpolation for some of the data slots of the received signal which do not already include a pilot signal. For each of a sequence of symbols, a respective Inverse Fast Fourier Transform is performed on the pilot signals and interpolated channel estimates in the data slots of that symbol, thereby determining a sequence of estimated CIRs for the sequence of symbols. Spurious channel components will vary across the sequence of estimated CIRs, whereas the true channel peaks will tend not to significantly vary across the sequence of estimated CIRs. Therefore the sequence of estimated CIRs can be filtered (e.g. with a low-pass filter) to attenuate the spurious components, thereby determining a CIR for the signal for which the distortion caused by the spurious components is reduced.

18 Claims, 10 Drawing Sheets

(56) References Cited

U.S. PATENT DOCUMENTS

| | | | |
|---|---|---|---|
| 2008/0112494 A1* | 5/2008 | Akella | H04L 25/0204 375/260 |
| 2008/0123757 A1* | 5/2008 | Ido | H04L 25/0232 375/260 |
| 2008/0130771 A1* | 6/2008 | Fechtel | H04L 25/0212 375/260 |
| 2011/0064163 A1* | 3/2011 | Li | H04L 5/0048 375/316 |
| 2011/0064170 A1* | 3/2011 | Paik et al. | 375/346 |
| 2011/0274220 A1* | 11/2011 | Andgart | G01S 5/0221 375/342 |
| 2011/0280349 A1 | 11/2011 | Hong et al. | |
| 2012/0020427 A1* | 1/2012 | Butussi | H04L 25/0232 375/285 |
| 2012/0287803 A1* | 11/2012 | Niu et al. | 370/252 |

* cited by examiner

| Symbol | Subcarrier | | | | | | Pilot phase pattern |
|---|---|---|---|---|---|---|---|
| | 0 | 1 | 2 | 3 | 4 | 5 | |
| 0 | P | | | | | | 0 |
| 1 | | P | | | P | | 1 |
| 2 | | | P | | | P | 2 |
| 3 | | | | P | | | 3 |
| 4 | P | VP1 | VP2 | VP3 | P | VP5 | 0 |
| 5 | | P | | | | P | 1 |
| 6 | | | P | | | | 2 |
| 7 | | | | P | | | 3 |

DETERMINING SIGNAL CHANNEL IMPULSE RESPONSE USING SUBCARRIER PILOT SIGNALS

BACKGROUND

Many different transmission schemes may be used to transmit signals, for example over wireless or wired transmission systems. Some transmission schemes use frequency-division multiplexing (e.g. orthogonal frequency-division multiplexing (OFDM)), whereby a transmitted signal comprises a sequence of symbols which are transmitted over time, wherein each symbol comprises a plurality of distinct data slots for transmitting data using a respective plurality of subcarriers which are distinct in the frequency domain.

Signals are transmitted over a channel from a transmitter to a receiver. The channel will affect the signal, such that the signal transmitted from the transmitter is not the same as the signal received at the receiver. A channel impulse response (CIR) describes the effect that the channel will have on the signal, e.g. as a function of time. In particular, the CIR is the signal that would be received at the receiver if an instantaneous pulse (or "impulse") is transmitted from the transmitter. If the receiver can determine the CIR then the receiver will usually be able to more accurately decode the symbols in the received signal because the receiver can take into account the effect of the channel on the received signal.

In order for the receiver to determine the CIR, pilot signals are transmitted from the transmitter over the channel to the receiver. That is, some of the sub-carriers in some of the symbols carry pilot signals for measurement of the channel conditions. The receiver knows the characteristics (e.g. spectral shape) of the pilot signals that the transmitter will transmit, so by comparing the characteristics of the received pilot signals to the known characteristics of the pilot signals, the receiver can determine the effects of the channel on the pilot signals, thereby determining the CIR for the received signal. The pilot signals are applied to data slots of different symbols using different subcarriers in accordance with a pilot transmission scheme which is known to both the transmitter and the receiver. The transmission of a pilot signal in a data slot usually means that data cannot be transmitted in that data slot. Therefore, some systems reduce the number of pilot signals that are transmitted by making the assumption that the transmission channel is static in time for a number of symbols. With this assumption, the pilot signals can be applied to a sparse set of different subcarriers on different symbols such that over a range of symbols they will sound the channel with a sufficiently small frequency sampling interval that they can represent a channel with a suitable delay spread.

However, if the underlying assumption that the channel is static is not true then making this assumption may lead to distortion in the estimated channel impulse response when the pilot signals are considered from multiple symbols. The resulting distortion in the CIR may degrade processes at the receiver, such as equalization and tracking, which use the CIR.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Transmission channels are not normally completely static. Therefore, if an assumption that the channel is static is made in a determination of the CIR, then there will normally be some distortion in the determined CIR. The amount of distortion in the determined CIR will often depend upon the rate at which the channel changes. The examples described herein reduce distortion in a CIR determined for a signal, which may increase the resilience of a receiver to time variation of the channel (i.e. increase the Doppler resilience of the receiver).

In particular, there is provided a method of processing a signal to determine a channel impulse response for the signal, the signal adhering to a frequency-division multiplexing scheme in which the signal comprises a plurality of symbols, each of the symbols comprising a plurality of distinct data slots for transmitting data using a respective plurality of subcarriers which are distinct in the frequency domain, wherein pilot signals are applied to data slots of at least some different symbols using different subcarriers in accordance with a pilot transmission scheme, the method comprising: receiving the signal over a channel, wherein the pilot signals in the received signal are indicative of channel estimates for the data slots of the received signal which include the pilot signals; for at least some of the data slots of the received signal which do not include a pilot signal, determining channel estimates by time-interpolation of received pilot signals in other data slots of the received signal; and determining a channel impulse response for the signal using a plurality of the channel estimates, by: performing at least one inverse Fourier transform, and applying filtering, such that components of the channel impulse response determined for the signal which vary over time with particular frequencies are attenuated.

In an example, the step of determining a channel impulse response for the signal comprises: for each symbol of a sequence of the symbols, performing a respective inverse Fourier transform on the channel estimates for a plurality of the data slots of that symbol, thereby determining a sequence of respective estimated channel impulse responses for the sequence of symbols; and filtering the sequence of estimated channel impulse responses to attenuate components which vary with particular frequencies over the sequence of estimated channel impulse responses, thereby determining a channel impulse response for the signal.

In another example, the step of determining a channel impulse response for the signal using a plurality of the channel estimates comprises: filtering the plurality of the channel estimates over a sequence of the symbols to attenuate components which vary with particular frequencies over the sequence of symbols, thereby determining a set of filtered channel estimates for a respective set of the subcarriers; and performing an inverse Fourier transform on the set of filtered channel estimates, thereby determining the channel impulse response for the signal.

There is also provided a receiver configured to process a signal to determine a channel impulse response for the signal, the signal adhering to a frequency-division multiplexing scheme in which the signal comprises a plurality of symbols, each of the symbols comprising a plurality of distinct data slots for transmitting data using a respective plurality of subcarriers which are distinct in the frequency domain, wherein pilot signals are applied to data slots of at least some different symbols using different subcarriers in accordance with a pilot transmission scheme, the receiver comprising: a receive module configured to receive the signal over a channel, wherein the pilot signals in the received signal are indicative of channel estimates for the data slots of the received signal which include the pilot signals; an interpolation module configured to determine channel estimates for at least some of the data slots of the received signal which do not include a pilot signal, by time-interpolation of received pilot signals in other data slots of the received signal; and a processing block configured to determine a channel impulse response for the signal using a plurality of the channel estimates, the processing block comprising: an inverse Fourier transform module configured to perform at least one inverse Fourier transform, and a filter module configured to apply filtering, such that components of the channel impulse response determined for the signal which vary over time with particular frequencies are attenuated.

There is also provided a computer program product configured to process a signal to determine a channel impulse response for the signal, the computer program product being embodied on a computer-readable storage medium and configured so as when executed on a processor at a receiver to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 7 shows pilot signals applied to data slots of a signal in accordance with a pilot transmission scheme;

Figure 1:
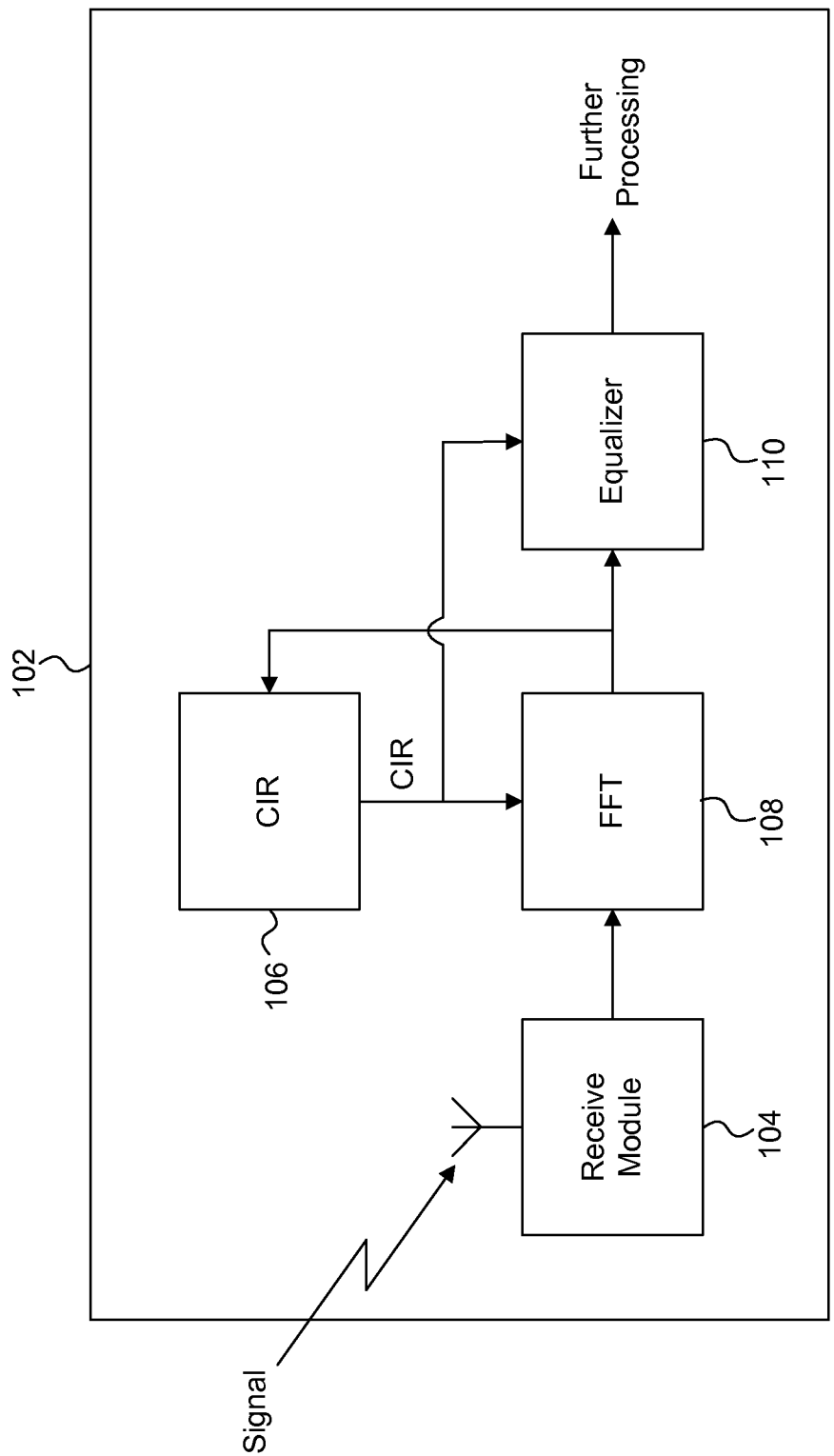
FIG. 1 shows a schematic diagram of a receiver.

Common reference numerals are used throughout the figures, where appropriate, to indicate similar features.

DETAILED DESCRIPTION

Embodiments will now be described by way of example only.

In examples described herein, distortion caused by spurious components in a determined CIR is reduced. In a frequency-division multiplexed transmission system (e.g. an OFDM transmission system), pilot signals may be applied to different subcarriers of different symbols in accordance with a pilot transmission scheme. Pilot signals in a received signal are indicative of channel estimates for the data slots of the received signal which include the pilot signals. Other channel estimates (which may be referred to herein as "virtual pilot signals") may be determined by time-interpolation for some of the data slots of the received signal which do not include a pilot signal in the received signal. In one example, for each of a sequence of symbols, a respective inverse Fourier transform is performed on the channel estimates (i.e. the "pilot signals") in the data slots of that symbol, thereby determining a sequence of respective estimated CIRs for the sequence of symbols. Spurious components (which are errors in the estimated CIRs caused by the time-interpolation, as described in more detail below) will vary across the sequence of estimated CIRs, whereas the true channel peaks in the CIRs will tend not to significantly vary across the sequence of estimated CIRs. Therefore the sequence of estimated CIRs can be filtered (e.g. with a low-pass filter) to attenuate the spurious components, thereby determining a CIR for the signal for which the distortion caused by spurious components is reduced. Since, in examples described herein, the filtering operations and the inverse Fourier transform operations are linear operations, the order of applying the filtering and the inverse Fourier transformation can be changed. Therefore, in some examples (described below with reference to FIGS. 10 and 11) the filtering is applied to the channel estimates and then an inverse Fourier transform is applied to the filtered channel estimates.

FIG. 1 shows a schematic diagram of a receiver 102 which is configured to receive a signal and process the signal. The receiver 102 comprises a receive module 104, a CIR block 106, a Fast Fourier Transform (FFT) block 108 and an equalizer block 110. An output of the receive module 104 is coupled to a first input of the FFT block 108. An output the FFT block 108 is coupled to an input of the CIR block 106 and to a first input of the equalizer block 110. An output of the CIR block 106 is coupled to a second input of the FFT block 108 and to a second input of the equalizer block 110. An output of the equalizer block 110 is provided as an output for further processing in the receiver 102. In the example shown in FIG. 1, the receiver 102 is configured to receive wireless signals at the receive module 104, and as such the receive module 104 is shown as comprising an antenna for receiving the wireless signals. However, in other examples, the signals may be wired signals and the receive module 104 would be configured for receiving the signals on a wire (and as such would most likely not comprise an antenna).

In operation, the receive module 104 receives a signal over a channel (e.g. a wireless or wired channel) and passes the received signal to the FFT block 108. The FFT block 108 performs a Fourier transform (e.g. a Fast Fourier Transform (FFT)) on the symbols of the received signal and provides an output (in the frequency domain) to the CIR block 106. In alternative examples, the received signal could be provided to the CIR block 106 without first being processed by the FFT block 108, in which case the CIR block 106 may include a FFT module for transforming the received signal into the frequency domain.

The CIR block 106 determines a CIR for the signal. The CIR will vary over time, so the CIR block 106 dynamically determines a CIR for the signal, and outputs the CIR to the FFT block 108 and to the equalizer block 110. The CIR block 106 determines the CIR for the signal as described in more detail below in a manner such that distortion in the determined CIR is reduced, as compared to the determination of the CIR in the systems described above in the background section which are based on the assumption that the channel is static.

The effects of the channel are frequency-dependent, such that the channel will affect different subcarriers differently. However, the effects of the channel conditions, for example fading caused by multipath propagation in the channel, can be considered as constant (i.e. flat) over the frequency of an individual subcarrier if the subcarrier is sufficiently narrowbanded (e.g., if the number of subcarriers over the whole channel is sufficiently large). By considering the channel conditions as constant over the frequency of an individual subcarrier, frequency-domain equalization is possible at the receiver 102, which is simpler to implement than time-domain equalization. Therefore, the frequency-domain symbols output from the FFT block 108 are passed to the equalizer block 110. The FFT block 108 uses the CIR determined by the CIR block 106 to position a FFT window for sampling the symbols of the received signal, e.g. for optimum performance, as described in more detail below with reference to FIGS. 2 to 4b. The equalizer block 110 performs equalization on the symbols in the frequency-domain in order to recover the symbols at the receiver 102. As would be apparent to a person skilled in the art, the receiver 102 may comprise other processing blocks which, for clarity, are not shown in FIG. 1. In particular, as indicated in FIG. 1, further processing may be applied to the output of the equalizer block 110 by one or more further processing blocks at the receiver 102, which are not shown in FIG. 1.

With reference to FIGS. 2 to 4b we will now describe how the FFT block 108 uses the CIR for the signal determined by the CIR block 106 to determine a position of the FFT window for sampling the symbols of the received signal.

Figure 2:
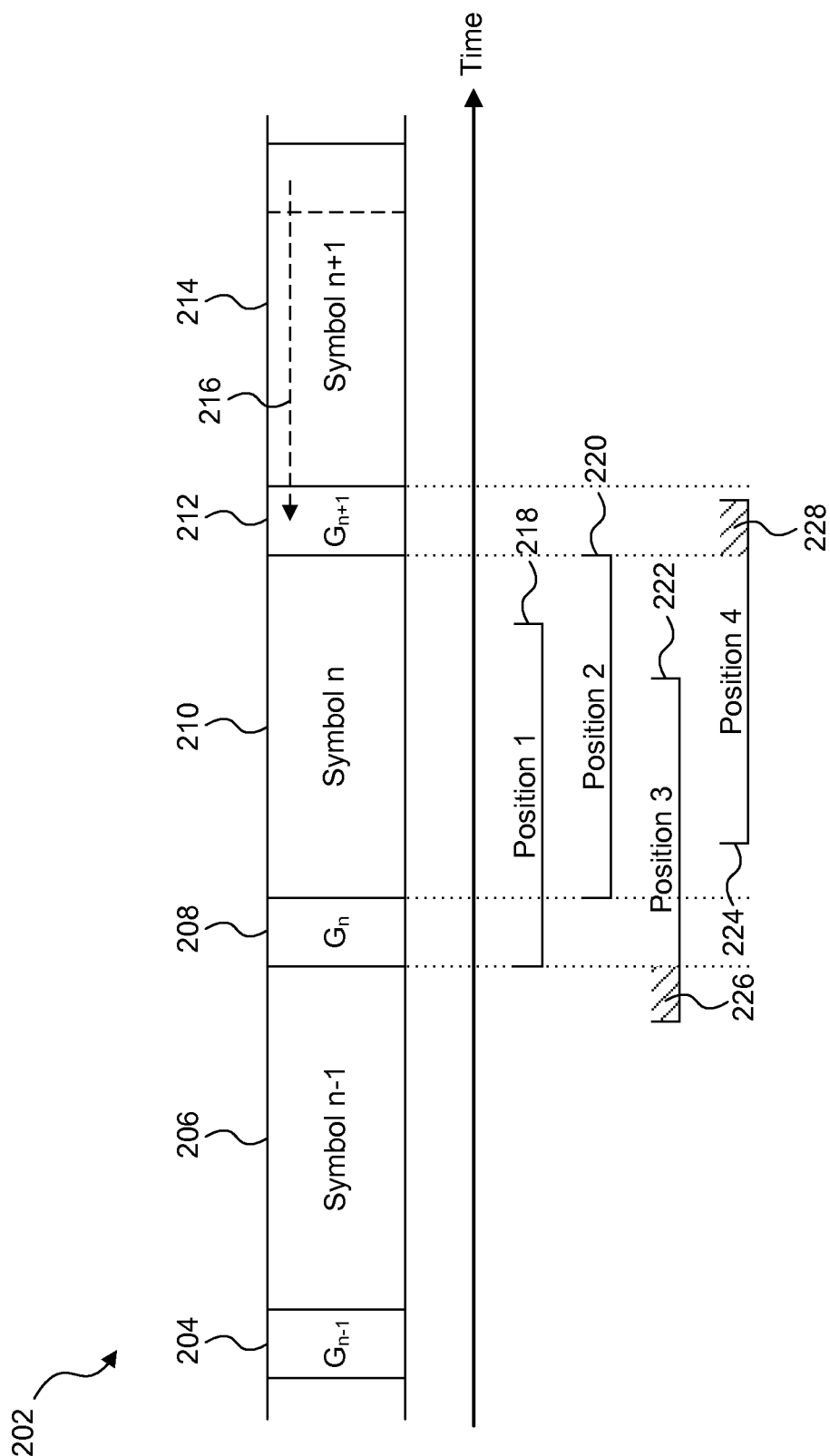
FIG. 2 is a timing diagram showing how the positioning of a Fast Fourier Transform (FFT) window relates to intersymbol interference (ISI)

FIG. 2 is a timing diagram showing some of the symbols of a received signal 202 as a function of time. In frequency-division multiplexing transmission systems (such as OFDM transmission systems) guard intervals may be included between the symbols in the signal to reduce the inter-symbol interference (ISI). FIG. 2 shows the signal 202 comprising an $(n-1)^{th}$ symbol 206 and its guard interval 204, an $n^{th}$ symbol 210 and its guard interval 208, and an $(n+1)^{th}$ symbol 214 and its guard interval 212. In the example shown in FIG. 2, the samples transmitted in the guard interval for a symbol are determined as a cyclic prefix of the symbol, and the guard interval is transmitted followed by the symbol. In other words, samples at the end of a symbol are copied into the symbol's guard interval. This is indicated for symbol (n+1) by the arrow 216 in FIG. 2, and the same applies for the other symbols although for clarity this is not shown in FIG. 2.

FIG. 2 shows four possible positions (in time) of the FFT window used by the FFT block 108 for sampling the $n^{th}$ symbol 210, in the simple example of a zero delay spread in the CIR, denoted 218, 220, 222 and 224 in FIG. 2. The duration of the FFT window is equal to the symbol duration excluding the guard interval. The first position 218 and the second position 220 for the FFT window include all of the samples of the nth symbol 210 and none of the samples of the other symbols of the signal 202. Since the guard interval consists of a copy of the end of the respective symbol, the FFT block 108 integrates over an integer number of sinusoid cycles for each of the multipaths in the channel when it performs a FFT for demodulation of the symbols using the first FFT window position 218. An FFT window position anywhere between (and including) the first position 218 and the second position 220 can be used by the FFT block 108 for sampling the $n^{th}$ symbol 210. The third position 222 is earlier than the first position 218, such that the start of the FFT window in the third position 222 includes samples from the $(n-1)^{th}$ symbol 206, as indicated by the hashed section 226. Therefore, if the FFT window used by the FFT block 108 is positioned at the third position 222 then there will be inter-symbol interference (ISI) present in the sampled symbols. Similarly, the fourth position 224 is later than the second position 220, such that the end of the FFT window in the fourth position 224 includes samples from the $(n-1)^{th}$ symbol 214, as indicated by the hashed section 228. Therefore, if the FFT window used by the FFT block 108 is positioned at the fourth position 224 then there will be inter-symbol interference (ISI) present in the sampled symbols.

Figure 3A:
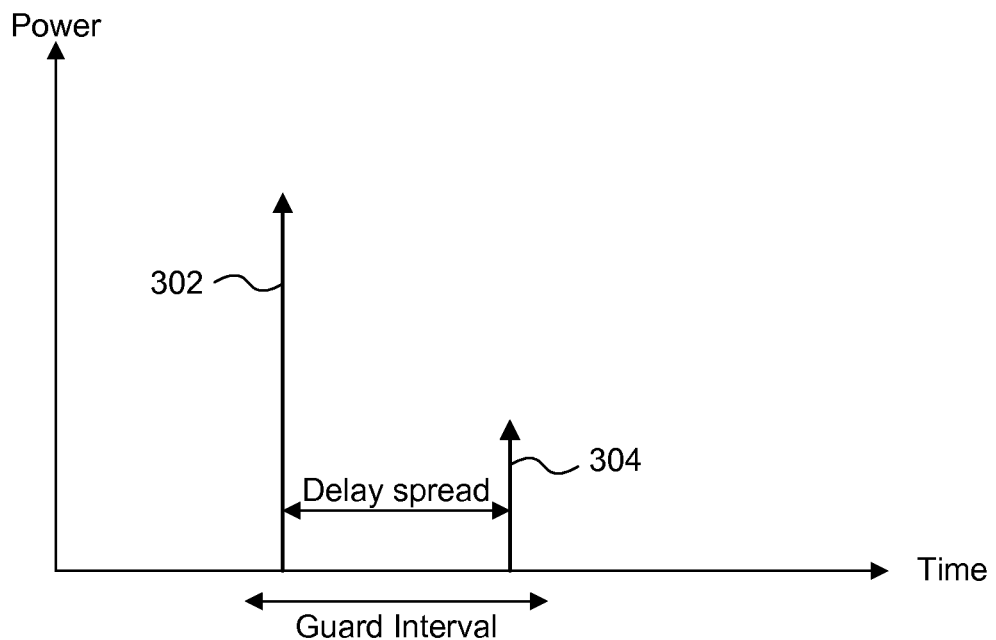
FIG. 3a shows a graph of the delay spread of the CIR in a first example.

The CIR determined by the CIR block 106 is used by the FFT block 108 to position the FFT window correctly to avoid, minimise, or at least reduce, the ISI in the symbols sampled by the FFT block 108. As an example, FIG. 3a shows a graph of the magnitude of the CIR as a function of time. In the example shown in FIG. 3a the CIR includes a strong peak 302 (e.g. corresponding to a direct path in the channel from the transmitter to the receiver) and a weaker peak 304 (e.g. corresponding to a reflected path in the channel from the transmitter to the receiver) which is delayed relative to the strong peak 302. The delay between the strong peak 302 and the weaker peak 304 indicates the delay spread of the channel. The delay spread is a measure of the difference between the time of arrival of the earliest significant multipath component (typically the line-of-sight, or "direct", component) and the time of arrival of the latest significant multipath component. The delay spread is mostly used in the characterization of wireless channels, but it also applies to any other multipath channel (e.g. multipath channels in optical fibres). FIG. 3a also shows the duration of the guard interval of the symbols in the signal 202. As can be seen, in the example shown in FIG. 3a the delay spread is shorter than the guard interval.

Figure 3B:
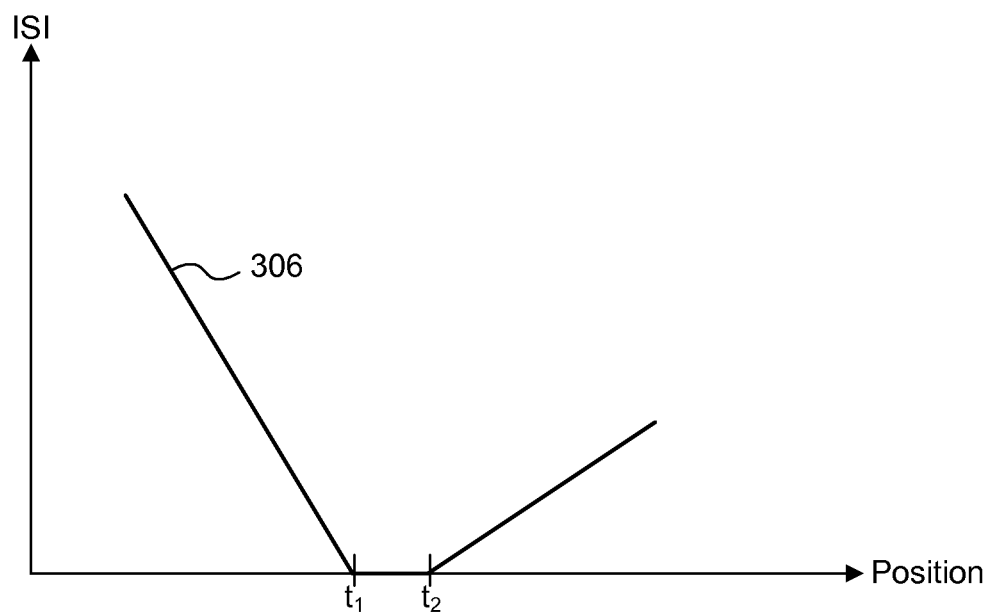
FIG. 3b shows a graph of ISI as a function of the position of the FFT window in the first example.

FIG. 3b shows a graph of the ISI 306 as a function of the position of the FFT window in relation to the example shown in FIG. 3a. Since the delay spread of the channel is shorter than the guard interval, it is possible to position the FFT window to include samples from only one symbol at a time. That is, there is a range of positions for the FFT window (between times $t_1$ and $t_2$ shown in FIG. 3b) at which there will be no ISI in the symbols sampled by the FFT block 108. For FFT positions earlier than $t_1$ the strong peak 302 overlaps with samples from the previous symbol causing ISI. For FFT positions later than $t_2$, the weak peak 304 overlaps with samples from the subsequent symbol causing ISI. Since the strong peak 302 is stronger than the weak peak 304, the magnitude of the gradient of the slope 306 on the graph shown in FIG. 3b is greater for positions earlier than $t_1$ than for positions later than $t_2$.

Figure 4A:
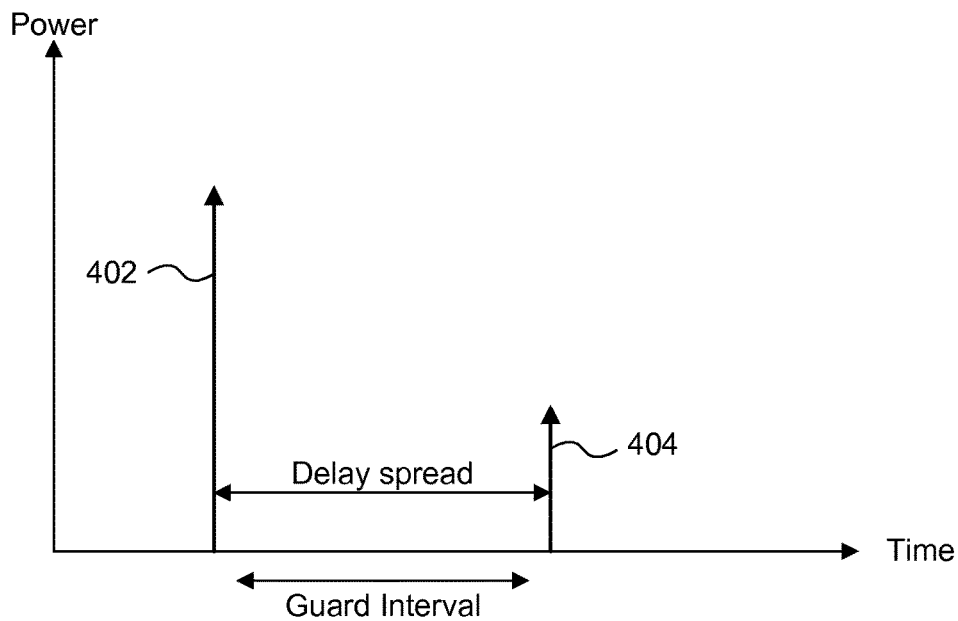
FIG. 4a shows a graph of the delay spread of the CIR in a second example.

As another example, FIG. 4a shows a graph of the magnitude of the CIR as a function of time. In the example shown in FIG. 4a the CIR includes a strong peak 402 (e.g. corresponding to a direct path in the channel from the transmitter to the receiver) and a weaker peak 404 (e.g. corresponding to a reflected path in the channel from the transmitter to the receiver) which is delayed relative to the strong peak 402. The delay between the strong peak 402 and the weaker peak 404 indicates the delay spread of the channel. FIG. 4a also shows the duration of the guard interval of the symbols in the signal 202. As can be seen, in the example shown in FIG. 4a the delay spread is longer than the guard interval.

Figure 4B:
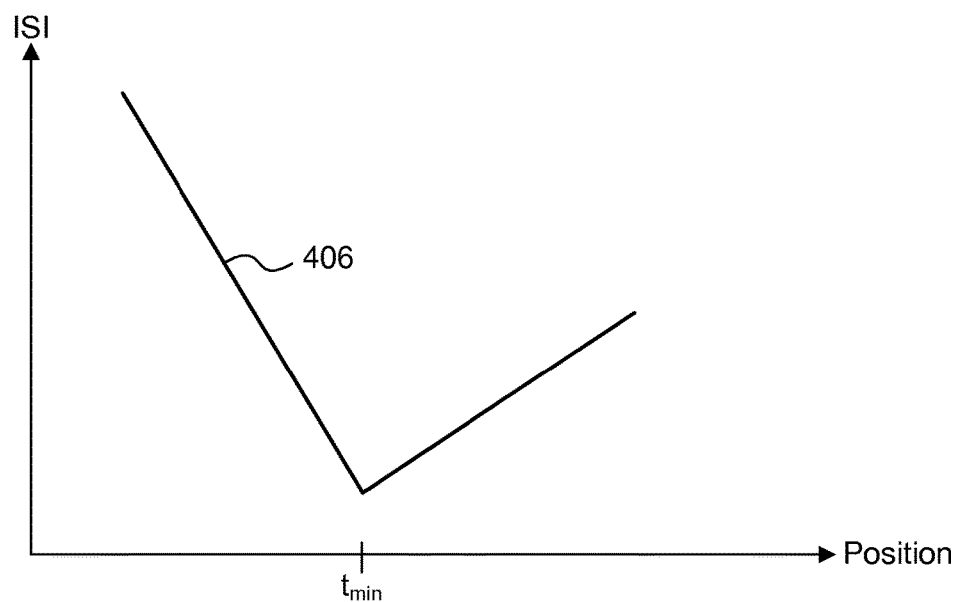
FIG. 4b shows a graph of ISI as a function of the position of the FFT window in the second example.

FIG. 4b shows a graph of the ISI 406 as a function of the position of the FFT window in relation to the example shown in FIG. 4a. Since the delay spread of the channel is longer than the guard interval, the symbols' samples are spread by the channel over time to such an extent that it is not possible to position the FFT window to include samples from only one symbol at a time. That is, there is no position for the FFT window at which there will be no ISI in the symbols sampled by the FFT block 108. The position of the FFT window for which there is a minimum ISI is indicated as $t_{min}$ in FIG. 4b. For FFT positions earlier than $t_{min}$, the strong peak 402 overlaps with samples from the previous symbol causing ISI. For FFT positions later than $t_{min}$, the weak peak 404 overlaps with samples from the subsequent symbol causing ISI. As with FIG. 3b described above, since the strong peak 402 is stronger than the weak peak 404, the magnitude of the gradient of the slope 406 on the graph shown in FIG. 4b is greater for positions earlier than $t_{min}$ than for positions later than $t_{min}$.

Therefore, in order to position the FFT window, the FFT block 108 may use the CIR determined by the CIR block 106 to estimate ISI as a function of the position of the FFT window and then determine the position of the FFT window which corresponds to the minimum ISI based on the estimate of the ISI. This is just one way in which the CIR is used by the receiver 102. The CIR may also be used for other purposes in the receiver 102 for processing the received signal, e.g. the CIR may be used by the equalizer block 110 to equalise the effect of the channel, thereby allowing recovery of the transmitted information from the signal.

It can therefore be appreciated that it is useful for the receiver to determine the CIR of the signal in order to correctly recover the transmitted information from the received signal. There are described below, with reference to FIGS. 5 to 11, examples of how the CIR for the signal can be determined in a manner which has reduced distortion compared to the examples described above in the background section which assume that the channel is static.

Figure 5:
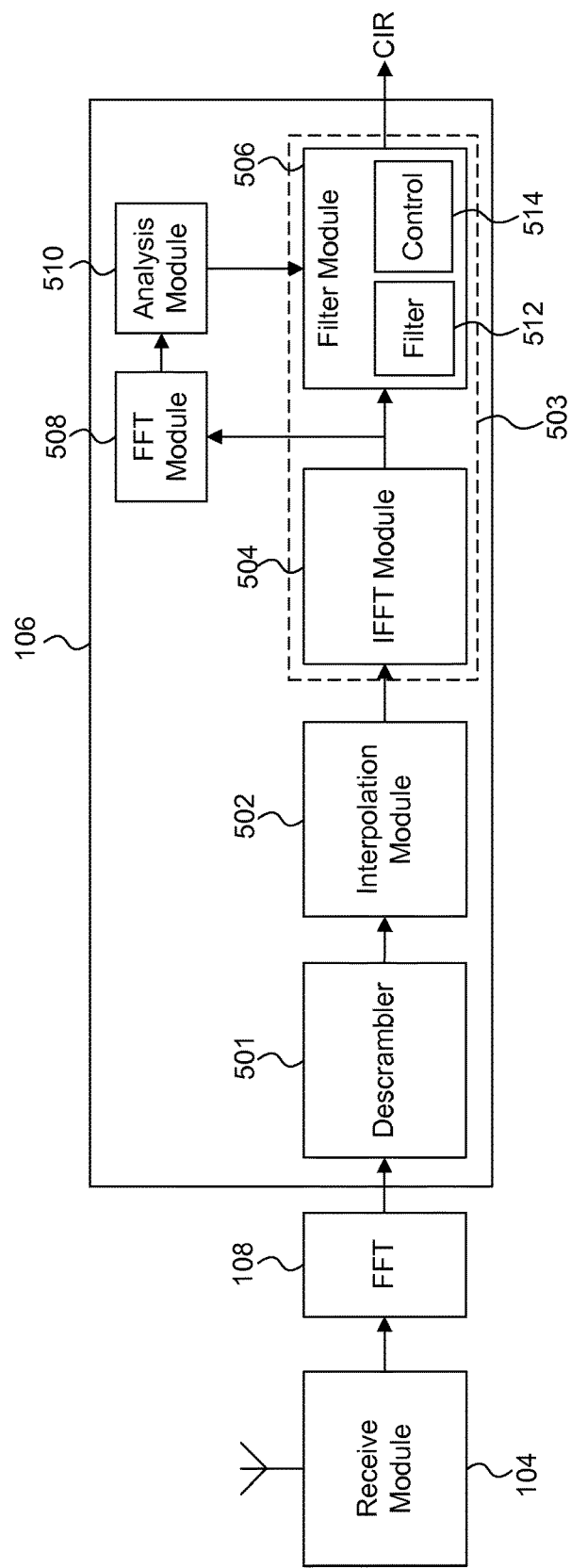
FIG. 5 shows some of the functional modules of the receiver in a first example.

FIG. 5 shows the receive module 104 and FFT block 108 and some of the functional modules of the CIR block 106. In particular, FIG. 5 shows that the CIR block 106 comprises a descrambler module 501; an interpolation module 502; a processing block 503 which includes an inverse Fourier transform module 504 and a filter module 506; a Fourier transform module 508; and an analysis module 510. The filter module 506 comprises a filter 512 and a control module 514. The modules and blocks described herein may be implemented in software, hardware, or a combination thereof. The inverse Fourier transform module 504 shown in FIG. 5 is implemented as an Inverse Fast Fourier Transform (IFFT) module 504, but in other examples any module configured to perform an inverse Fourier transform (i.e. a transform from the frequency domain to the time domain) may be used, such as a discrete inverse Fourier transform (IDFT) module. Similarly, the Fourier transform module 508 shown in FIG. 5 is implemented as a Fast Fourier Transform (FFT) module 508, but in other examples any module configured to perform a Fourier transform (i.e. a transform from the time domain to the frequency domain) may be used, such as a discrete Fourier transform (DFT) module. An output of the FFT block 108 is coupled to an input of the descrambler module 501. An output of the descrambler module 501 is coupled to an input of the interpolation module 502. An output of the interpolation module 502 is coupled to an input of the IFFT module 504. An output of the IFFT module 504 is coupled to a first input of the filter module 506 and to an input of the FFT module 508. An output of the FFT module 508 is coupled to an input of the analysis module 510. An output of the analysis module 510 is coupled to a second input of the filter module 506. An output of the filter module 506 is configured to provide a determined CIR for the signal as an output of the CIR block 106.

Figure 6:
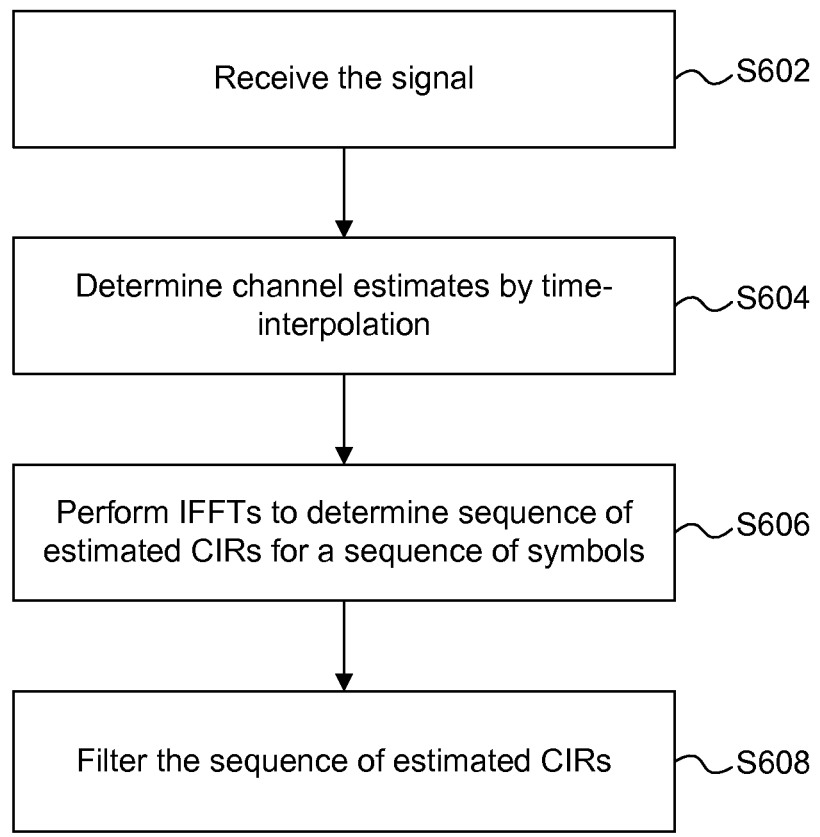
FIG. 6 shows a flow chart for a method of processing a signal to determine a CIR for the signal in the first example.

The operation of the CIR block 106 is described with reference to the flow chart shown in FIG. 6. In step S602 the receive module 104 receives the signal over a channel. As described above, the signal may be received via a wireless channel or a wired channel. The signal adheres to a frequency-division multiplexing scheme in which the signal comprises a plurality of symbols, each of the symbols comprising a plurality of distinct data slots for transmitting data using a respective plurality of subcarriers which are distinct in the frequency domain. Pilot signals are applied to data slots of at least some different symbols using different subcarriers in accordance with a pilot transmission scheme. The pilot signals in the received signal are indicative of channel estimates for the data slots of the received signal which include the pilot signals. The pilot signals may be applied to data slots of the symbols in a regular repeating pattern across the different subcarriers in accordance with the pilot transmission scheme. That is, pilot signals may be applied to data slots using different subcarriers for different symbols in a known pattern according to a pilot transmission scheme. The pilot signals may be scrambled in the received signal, e.g. using a known pseudo-random binary sequence (PRBS) in order to ensure that the pilot signature has characteristics of white noise in the time domain. Therefore, the descrambler module 501 descrambles the received signal according to the known PRBS. In other examples, the pilot signals might not be scrambled, as and such the descrambler module 501 might not be implemented.

FIG. 7 shows a simple example of a grid of data slots of six consecutive subcarriers for eight consecutive symbols of the signal, such that in total FIG. 7 shows forty eight data slots of the signal. It will be appreciated that in other examples there may be more (or less) than six subcarriers for each of the symbols, and the signal may include more (or less) than eight symbols. In the example shown in FIG. 7, the regular repeating pattern of the pilot signals is a diagonal repeating pattern across the different subcarriers of the symbols in the signal, wherein the pilot signals are denoted by "P"s in the data slots shown in FIG. 7. That is, pilot signals are applied to subcarriers 0 and 4 of symbol 0; pilot signals are applied to subcarriers 1 and 5 of symbol 1; a pilot signal is applied to subcarrier 2 of symbol 2; a pilot signal is applied to subcarrier 3 of symbol 3; pilot signals are applied to subcarriers 0 and 4 of symbol 4; pilot signals are applied to subcarriers 1 and 5 of symbol 5; a pilot signal is applied to subcarrier 2 of symbol 6; and a pilot signal is applied to subcarrier 3 of symbol 7. Pilot signals are not applied to the other data slots (which do not have a letter "P" shown in FIG. 7). Data may be transmitted in the data slots which do not include pilot signals. In other examples, other pilot transmission schemes may be used whereby pilot signals are applied to the data slots in patterns which are different to the pattern shown in FIG. 7.

In an example, in order to determine a CIR which can represent a delay spread of sufficient length for describing the channel, the frequency sampling interval should be smaller than four subcarriers as is provided by the pilot signals that are present in the received signal. Rather than assuming that the channel is static such that pilot signals are assumed not to have changed from one symbol to the next, the received pilot signals can be used to estimate (e.g. by interpolation) what the pilot signals would be like in other data slots of the received signal which do not include a pilot signal. In particular, in step S604 the interpolation module 502 determines pilot signals, i.e. channel estimates, for some of the data slots of the signal which do not already include a pilot signal. The pilot signals (i.e. channel estimates) determined in step S604 are determined by time-interpolation of received pilot signals in other data slots of the received signal. As a matter of terminology, "time-interpolation" as used herein is not intended to be strictly limited to interpolation in the time domain, and may, for example, include extrapolation in the time domain as well. Furthermore, the pilot signals (i.e. channel estimates) determined in step S604 may be referred to herein as "virtual pilot signals" since they are not actually included in the received signal. The virtual pilot signals for symbol 4 (denoted 702 in FIG. 7) are shown in FIG. 7 and are determined by time-interpolation from received pilot signals in data slots of the received signal as indicated by the dashed arrows. The interpolation is in the time domain, such that a virtual pilot signal for a particular subcarrier is determined from received pilot signals for that particular subcarrier from other symbols (i.e. the dashed arrows in FIG. 7 are vertical). For example, a virtual pilot signal for subcarrier 1 (denoted VP1 in FIG. 7) is determined for symbol 4 by time-interpolation of the pilot signals for subcarrier 1 from symbols 1 and 5. Similarly, a virtual pilot signal for subcarrier 2 (denoted VP2 in FIG. 7) is determined for symbol 4 by time-interpolation of the pilot signals for subcarrier 2 from symbols 2 and 6. Similarly, a virtual pilot signal for subcarrier 3 (denoted VP3 in FIG. 7) is determined for symbol 4 by time-interpolation of the pilot signals for subcarrier 3 from symbols 3 and 7. Similarly, a virtual pilot signal for subcarrier 5 (denoted VP5 in FIG. 7) is determined for symbol 4 by time-interpolation of the pilot signals for subcarrier 5 from symbols 1 and 5. Virtual pilot signals may be determined for any of the symbols, but for clarity only those determined for symbol 4 are shown in FIG. 7. Any suitable interpolation technique (e.g. extrapolation, linear interpolation or higher order interpolation may be used to implement the time-interpolation of the pilot signals in the received signal to determine the virtual pilot signals).

It is apparent from FIG. 7 that when the virtual pilot signals have been determined in step S604 for a symbol (e.g. for symbol 4 shown in FIG. 7) then there are many pilot signals, i.e. channel estimates, (either actual pilot signals from the received signal or virtual pilot signals) which can be used to estimate a CIR for the symbol with a duration of sufficient length for describing the delay spread of the channel. In the example, shown in FIG. 7, there is a pilot signal, i.e. channel estimate, for every subcarrier of symbol 4, so a CIR of duration, $T=1/\Delta f$ can be determined, where $\Delta f$ is the frequency interval between adjacent subcarriers.

In step S606 the IFFT module 504 performs a respective IFFT on the channel estimates (i.e. both actual and virtual pilot signals) for each of a sequence of symbols in the received signal. The result of the inverse Fourier transform for a symbol is an estimated CIR for the symbol. Therefore by performing a sequence of IFFTs for the sequence of symbols, the IFFT module 504 determines a sequence of CIRs for the respective sequence of symbols.

Figure 8:
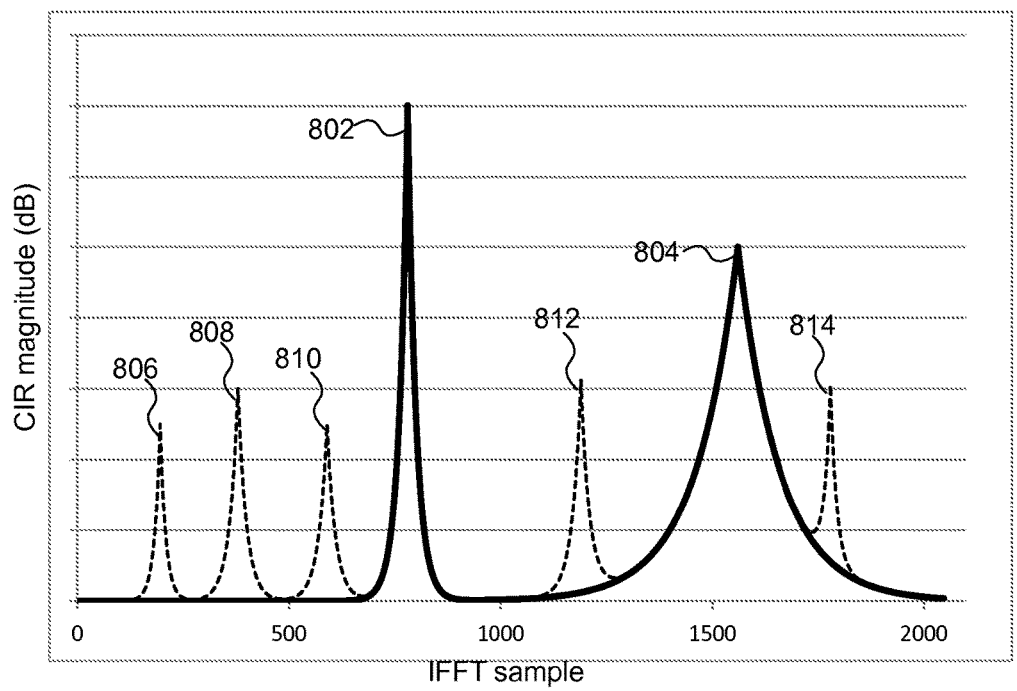
FIG. 8 shows a simplified example of the magnitude of a CIR estimated for a symbol.

FIG. 8 shows a simplified example of the magnitude of the CIR estimated for a symbol. For the example shown in FIG. 8, there are 2048 consecutive (in frequency) subcarriers over which the IFFT is performed to determine the CIR shown in FIG. 8 for a symbol. Therefore, the CIR comprises values at 2048 IFFT bin positions. In other words, the CIR comprises 2048 IFFT samples. In other examples, a different number of subcarriers are included in the signal and the IFFT is performed over a different number of subcarriers such that the CIR includes a different number of IFFT samples. In the simplified example shown in FIG. 8 the estimated CIR for a symbol has seven peaks, labelled 802, 804, 806, 808, 810, 812 and 814. The peaks 802 and 804 correspond to true paths in the channel, and the solid line in FIG. 8 represents the ideal CIR that would be determined for the channel if no distortion was present in the CIR. The peaks 806, 808, 810, 812 and 814 are false paths in the estimated CIR (referred to herein as "spurious components") which result from the periodic nature of the pilot signals in the frequency domain, as described in more detail below. The dashed line in FIG. 8, which includes the spurious components indicated by the peaks 806, 808, 810, 812 and 814 shows distortion in the estimated CIR for the symbol.

The distortion in the estimated CIR caused by the spurious components is often the dominant component of the distortion in the estimated CIR. Therefore, removing the distortion caused by the spurious components would significantly reduce the distortion in the CIR estimates.

The time-interpolation of the pilot signals described above in step S604 introduces different phases of pilot signals (i.e. channel estimates) into the data slots of a symbol. As an example, the time interpolation is linear interpolation whereby a virtual pilot signal is determined by performing a weighted sum of two of the received pilot signals from other symbols. The number of different phases of the pilot signals is set by the pattern of pilot signals in the received signal. For example, in the example shown in FIG. 7, there are four different phases of pilot signals (0, ¼, ½ and ¾) which are arranged in four pilot phase patterns as described below. For example, the pilot signal in subcarrier 0 of symbol 4 has a zero phase. The virtual pilot signal in subcarrier 1 of symbol 4 (VP1) may be considered to have a ¼ cycle phase because it is determined by time interpolation of the pilot signals from symbols 1 and 5. Since symbol 5 is closer (in time) to symbol 4 than symbol 1 is, the weighting of the pilot signal from symbol 5 is greater than the weighting of the pilot signal from symbol 1 in the weighted sum used to determine VP1. For example, the weighting of the pilot signal from symbol 5 may be 0.75 and the weighting of the pilot signal from symbol 1 may be 0.25 in the weighted sum for determining VP1.

Using the same principles, the virtual pilot signal in subcarrier 2 of symbol 4 (VP2) may be considered to have a ½ cycle phase because it is determined by time interpolation of the pilot signals from symbols 2 and 6. For example, the weighting of the pilot signal from symbol 6 may be 0.5 and the weighting of the pilot signal from symbol 2 may be 0.5 in the weighted sum for determining VP2. Similarly, the virtual pilot signal in subcarrier 3 of symbol 4 (VP3) may be considered to have a ¾ cycle phase because it is determined by time interpolation of the pilot signals from symbols 3 and 7. For example, the weighting of the pilot signal from symbol 7 may be 0.25 and the weighting of the pilot signal from symbol 3 may be 0.75 in the weighted sum for determining VP3. The phases of the pilot signals will cycle through the four phases across the subcarriers of a symbol. For example, the pilot signal in subcarrier 4 of symbol 4 has a phase of zero, and the virtual pilot signal in subcarrier 5 of symbol 5 (VP5) has a ¼ cycle phase, and so on. There are four different phases of the pilot signals because the pilot signals are determined by four different combinations of one or more pilot signals from the symbols of the received signal. In general, the number of phases of the pilot signals is set by the pattern of the pilot signals applied to the data slots of the symbols according to the pilot transmission scheme. The pattern of pilot phases varies from symbol to symbol (e.g. symbol 5 would start at a ¾ cycle phase in subcarrier 0 rather than a zero phase in subcarrier 0 as is the case for symbol 4). In the example shown in FIG. 7 there are four different pilot phase patterns which are denoted 0, 1, 2 and 3, whereby the symbols cycle through the different pilot phase patterns. This is shown in the final column in FIG. 7. As shown in FIG. 7, symbols 0 and 4 have a first pilot phase pattern ("pattern 0") wherein subcarriers 0 and 4 include the received pilot signals; symbols 1 and 5 have a second pilot phase pattern ("pattern 1") wherein subcarriers 1 and 5 include the received pilot signals; symbols 2 and 6 have a third pilot phase pattern ("pattern 2") wherein subcarrier 2 includes the received pilot signals; and symbols 3 and 7 have a fourth pilot phase pattern ("pattern 3") wherein subcarrier 3 includes the received pilot signals.

Since the channel may change over time (i.e. there is no assumption that the channel is static), the pilot signals of symbols received at different times may differ, and as such applying different weightings to pilot signals from different symbols may result in a different error being introduced into the pilot signals which have different phases. Therefore the determination of the virtual pilot signals by time-interpolation of pilot signals from different symbols introduces an error into the virtual pilot signals of a symbol which varies cyclically over the subcarriers of the symbol (i.e. an error which varies cyclically over frequency). When an IFFT is performed on the pilot signals of a symbol in step S606, errors which vary cyclically in the frequency domain will correspond to peaks in the result of the IFFT, i.e. peaks in the time domain, which can be seen in the example shown in FIG. 8 as the spurious components 806, 808, 810, 812 and 814. It can therefore be appreciated that the spurious components are peaks which occur in the CIR due to imperfections in the determination of the channel estimates (i.e. the virtual pilot signals) by time-interpolation.

Figure 9:
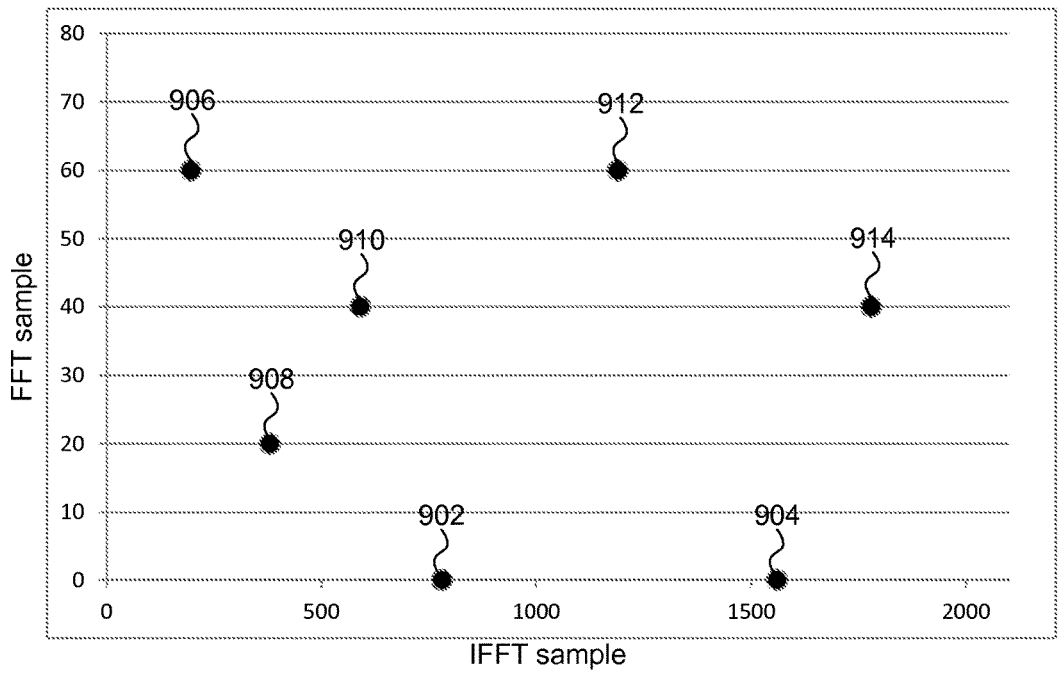
FIG. 9 shows a surface plot of the results of a Fourier transform over a sequence of estimated CIRs for a sequence of symbols.

A sequence of estimated CIRs for a sequence of symbols can be analysed to see how the peaks in the estimated CIRs vary in time over the sequence of estimated CIRs. In particular, for each of a plurality of the IFFT bin positions of the estimated CIRs, the FFT module 508 may perform a Fourier transform (e.g. a Fast Fourier Transform (FFT)) over the sequence of estimated CIRs. The results of such a Fourier transform are shown in FIG. 9. In particular FIG. 9 is a simplified surface plot indicating seven peaks (labelled 902, 904, 906, 908, 910, 912 and 914) at particular IFFT bin positions and FFT bin positions. FIG. 9 is generated by producing an estimated CIR for a sequence of eighty consecutive symbols, wherein each estimated CIR is estimated as described above by performing an IFFT on the pilot signals in 2048 subcarriers of a symbol. The time series of eighty complex samples for each of the 2048 bins of the CIRs are then Fourier transformed (i.e. by running 2048 eighty point Fourier transforms) and the surface plot of FIG. 9 shows the magnitude of the results of the FFT.

It can be seen that the two true peaks 902 and 904 caused by different paths through the channel (corresponding to peaks 802 and 804 in FIG. 8) are shown centred close to the zero frequency component across the sequence of estimated CIRs. FIG. 9 is a simplification, and in other examples the true peaks 902 and 904 may be spread across different frequency components of the results of the FFT, but there would still be a strong magnitude of the peaks 902 and 904 at low frequency components (e.g. at frequencies close to the zero frequency component) of the results of the FFT because whilst the channel is not stationary it varies slowly with respect to the symbol duration.

In contrast, the spurious components vary somewhat regularly over the sequence of estimated CIRs as the pattern of the pilot phases varies over time for different symbols. Therefore, in the results of the FFT, the peaks 906, 908, 910, 912 and 914 in the surface plot (which correspond to the peaks of the spurious components 806, 808, 810, 812 and 814 shown in FIG. 8) will occur at non-zero frequency components. Since the FFT was performed on estimated CIRs for a sequence of eighty consecutive symbols to produce the graph shown in FIG. 9, the frequency bin 80 corresponds to the symbol rate ($F_s$), i.e. to the frequency with which the symbols are received. Due to the pilot transmission scheme used in examples described above, the pilot phase pattern which is applied to the symbols cycles through four different patterns for different symbols. As such, the errors due to the time-interpolation (causing the spurious components) result in non-zero frequency components across the sequence of estimated CIRs. In particular, the spurious components have strong frequency components at $$\frac{F_s}{4}, \frac{F_s}{2}$$

and $$\frac{3F_s}{4}$$

(i.e. in the bins 20, 40 and 60 of the results of the FFT) in the example shown in FIG. 9. In FIG. 9 it can be seen that the peak 906 has a frequency of approximately $$\frac{3F_s}{4},$$

the peak 908 has a frequency of approximately $$\frac{F_s}{4},$$

the peak 910 has a frequency of approximately $$\frac{F_s}{2},$$

the peak 912 has a frequency of approximately $$\frac{3F_s}{4},$$

and the peak 914 has a frequency of approximately $$\frac{F_s}{2}.$$

Therefore, there is a difference in the frequency component of the spurious components and the true peaks across the sequence of estimated CIRs. As such, by applying a suitable filter, the frequency components in the estimated CIRs which relate to spurious components can be attenuated, thereby reducing the distortion in the CIR for the signal.

That is, an analysis of the distortion caused by the spurious components shows that its energy is concentrated about $$\frac{F_s}{4}, \frac{F_s}{2}$$

and $$\frac{3F_s}{4},$$

whereas the desired channel components are concentrated about 0 Hz (and may be more broadly spread across frequencies, although that is not shown in FIG. 9). As described above, this is due to the pilot phase pattern cycling through a number of different patterns in time (one pattern per symbol), such that the channel is sampled with the same number of different sampling patterns. When the pilot signals of multiple symbols are combined by time-interpolation (in order to attain the desired time span of the CIR), a periodic error in time arises.

In step S608 the filter module 506 filters the sequence of estimated CIRs to attenuate components which vary with particular frequencies over the sequence of estimated CIRs to thereby determine a CIR for the signal. The "particular frequencies" are the frequencies with which the spurious components vary over the sequence of estimated CIRs, e.g.

$$\frac{F_s}{4}, \frac{F_s}{2}$$

and $$\frac{3F_s}{4}$$

in the example described above. Therefore the dashed peaks shown in FIG. 8 (peaks 806, 808, 810, 812 and 814) will be attenuated, but the peaks 802 and 804 will not be significantly attenuated, such that the filtered CIR may closely match the solid line shown in FIG. 8 (i.e. without the dashed peaks).

The CIR block 106 does not necessarily need to calculate the FFT of the sequence of estimated CIRs in order to determine the frequencies at which the spurious components are present (and therefore might not include the FFT module 508 or the analysis module 510). As described above, the frequencies at which the spurious components occur over a sequence of estimated CIRs depends upon the pilot transmission scheme that is used. Therefore, the particular frequencies at which the spurious components are likely to occur can be determined based on the pilot transmission scheme (without actually finding the spurious components by performing an FFT). For example, if the pilot transmission scheme that is described above is used, then the filter module 506 can identify the likely spurious component frequencies at $$\frac{F_s}{4}, \frac{F_s}{2}$$

and $$\frac{3F_s}{4},$$

and can filter the sequence of estimated CIRs to attenuate these frequency components.

However, in some examples, the CIR block 106 may include the FFT module 508 and the analysis module 510. As described above, the FFT module 508 can be used to perform a FFT over the sequence of estimated CIRs for each of a plurality of the IFFT bin positions of the estimated CIRs. The analysis module 510 can then analyse the results of the FFT to identify the frequencies of the spurious components by finding peaks at non-zero frequencies in the results of the FFT. The peaks at non-zero frequencies in the results of the FFT are indicative of spurious components in the estimated CIRs. The indication of the identified frequencies can then be passed to the filter module 506 so that the filter module can filter the sequence of estimated CIRs to attenuate the identified frequency components.

The filter module 506 comprises the filter 512 which filters the sequence of estimated CIRs to attenuate the spurious components therefrom. The filter module 506 also comprises the control module 514 which controls the filtering applied by the filter 512. In particular, the control module 514 may control the filter 512 to ensure that the filter 512 attenuates the components which vary with the identified spurious component frequencies over the sequence of estimated CIRs.

The filter 512 may be a low-pass filter which applies low-pass filtering to the sequence of estimated CIRs. The low-pass filter can attenuate the spurious component frequencies (e.g. at $$\frac{F_s}{4}, \frac{F_s}{2}$$

and $$\left.\frac{3F_s}{4}\right)$$

without attenuating the true peaks which are centred at low (e.g. zero) frequency.

A simple and easy-to-implement low-pass filtering technique is to integrate and dump. This constrains the amount of memory (e.g. RAM) that is required for implementation of the filter 512 to one CIR buffer without constraining the order of the filter 512. Therefore, the filter 512 may be implemented as an integrate and dump filter, which integrates the estimated CIRs over time and outputs the result of the integration after an integration period. The integration period is matched to the pilot pattern repeat-rate. In other words, the number of integrated estimated CIRs in one integration period is equal to a positive integer multiplied by the number of different patterns of pilot signal phases in the symbols. In the examples described above, there are four different pilot phase patterns. Therefore, the integration period preferably includes a multiple of four (e.g. 4, 8, 12 or 16, etc.) of the estimated CIRs. In this way, the frequency components of the spurious components will be attenuated by the integrate and dump filter 512. The integrate and dump filter 512 therefore acts as a rectangular windowed filter, e.g. with a window size of $nD_y$, where $n \geq 1$, $n \in \mathbb{Z}$ and $D_y$ is the number of pilot phase patterns. This filter will contain nulls at $$\frac{xF_s}{nD_y}$$

where $x=0 \ldots (nD_y-1)$. Such a filter is both cheap to implement with respect to processing and memory requirements and also well suited for attenuating the spurious components (because the nulls of the filter lie at the frequencies where the spurious components are expected), thereby significantly reducing the distortion of the CIR for the signal caused by the spurious components. However, any other suitable type of filtering technique may be used.

The CIR for the signal determined by the CIR block 106 is output from the filter module 506 for use in the receiver 102 for processing the received signal, e.g. by the FFT block 108 and the equalizer block 110 as described above.

In the examples described above pilot signals are included in all of the subcarriers (albeit over a range of different symbols). In other examples there may be some subcarriers for which no pilot signals are included in any of the symbols. In those examples, time interpolation is not used to determine pilot signals for all of the subcarriers of a symbol, but this does not prevent the examples being implemented according to the description above for determining the CIR of the signal.

That is, in the examples described above, following the time-interpolation in step S604, there is a pilot signal (either received or virtual) in each of the subcarriers of symbol, for use in determining the estimated CIR for that symbol. However, in other examples, the time-interpolation might not determine a pilot signal for all of the subcarriers of a symbol which do not include received pilot signals. That is, in some examples, the IFFT performed in step S606 for a symbol might not be performed using pilot signals from each of the subcarriers of the symbol. This may reduce the length of the CIR that can be estimated for the symbol, but that may be acceptable, e.g. if the estimated CIR is still longer than the delay spread of the channel.

In the examples described above, the sequence of symbols for which estimated CIRs are determined includes a set of consecutive symbols in the received signal. For each of the symbols of the sequence of consecutive symbols, a CIR is estimated and the resulting sequence of consecutive estimated CIRs are filtered to determine the CIR for the signal. However, in other examples, the sequence of symbols for which estimated CIRs are determined includes some but not all of a set of consecutive symbols in the received signal. For example, 8 symbols from each block of 32 consecutive symbols may be used such that the resulting sequence of estimated CIRs may include CIRs estimated for symbols 0-7 and then from symbols 32-39 and then from 64-71, etc. Reducing the number of symbols for which the CIR is estimated reduces the computational power used by the CIR block 106. In the example given above, the computational load associated with determining the CIRs would be reduced by approximately ¾, as CIRs are estimated for only ¼ of the symbols. Furthermore, the magnitude component of the channel is usually slowly varying with respect to the symbol rate of the signal, such that generating the estimated CIRs for only a subset of the symbols (rather than for all of the symbols) might not significantly reduce the accuracy of the final determined CIR of the signal. The proportion of the symbols for which the CIR is estimated is an implementation detail which may be fixed or variable depending on the use to which the CIR for the signal is to be put.

Figure 10:
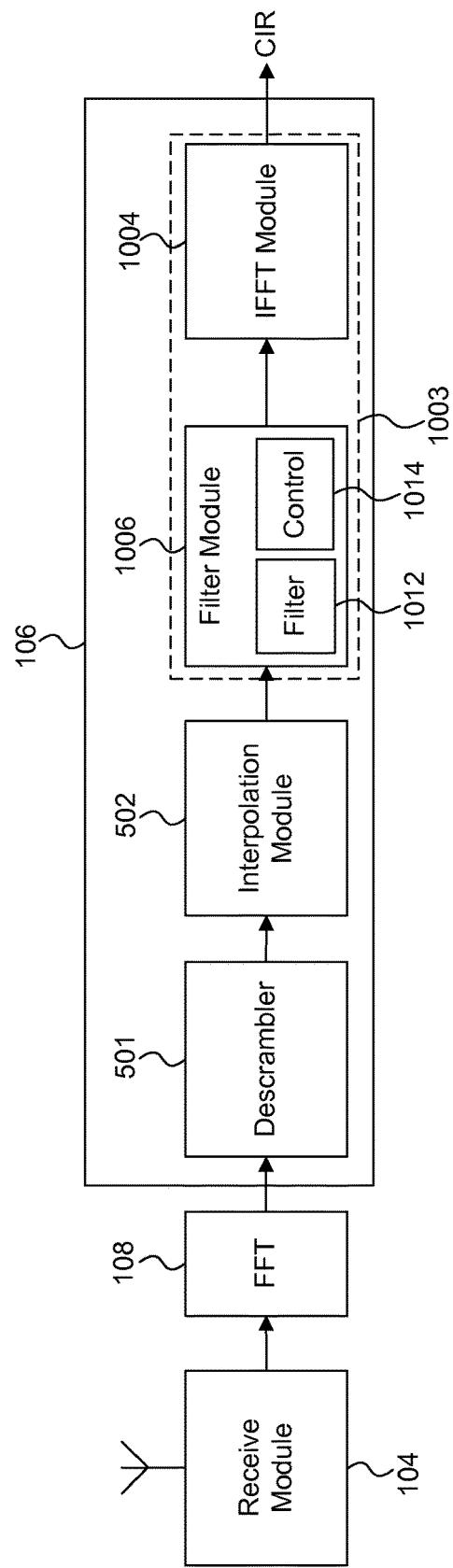
FIG. 10 shows some of the functional modules of the receiver in a second example.

In the examples described above with reference to FIGS. 5 and 6 the IFFT module 504 receives the channel estimates (i.e. pilot signals) from the interpolation module 502 and the filter module 506 receives the output from the IFFT module 504. However, as mentioned above, the filtering and inverse Fourier transform operations described herein are linear operations, and as such the order of applying the filtering and the inverse Fourier transformation can be switched. FIG. 10 shows some of the functional modules of the receiver 102 in a second example. The receiver 102 shown in FIG. 10 includes some of the same modules as described above in relation to FIG. 5, which are denoted with the same reference numerals in FIG. 10. That is, FIG. 10 shows the receive module 104, the FFT block 108, and the CIR block 106 including the descrambler module 501 and the interpolation module 502. However, FIG. 10 also shows the CIR block 106 comprising a processing block 1003 coupled to the output of the interpolation module 502. The processing block 1003 is different to the processing block 503 shown in FIG. 5. That is, the processing block 1003 includes a filter module 1006 and an inverse Fourier transform module 1004 (which in this example is implemented as an IFFT module), wherein the filter module comprises a filter 1012 and a control module 1014. The modules and blocks shown in FIG. 10 may be implemented in software, hardware, or a combination thereof. In this example, the CIR block 106 does not include an FFT module or an analysis module similar to the FFT module 508 and analysis module 510 shown in FIG. 5.

Figure 11:
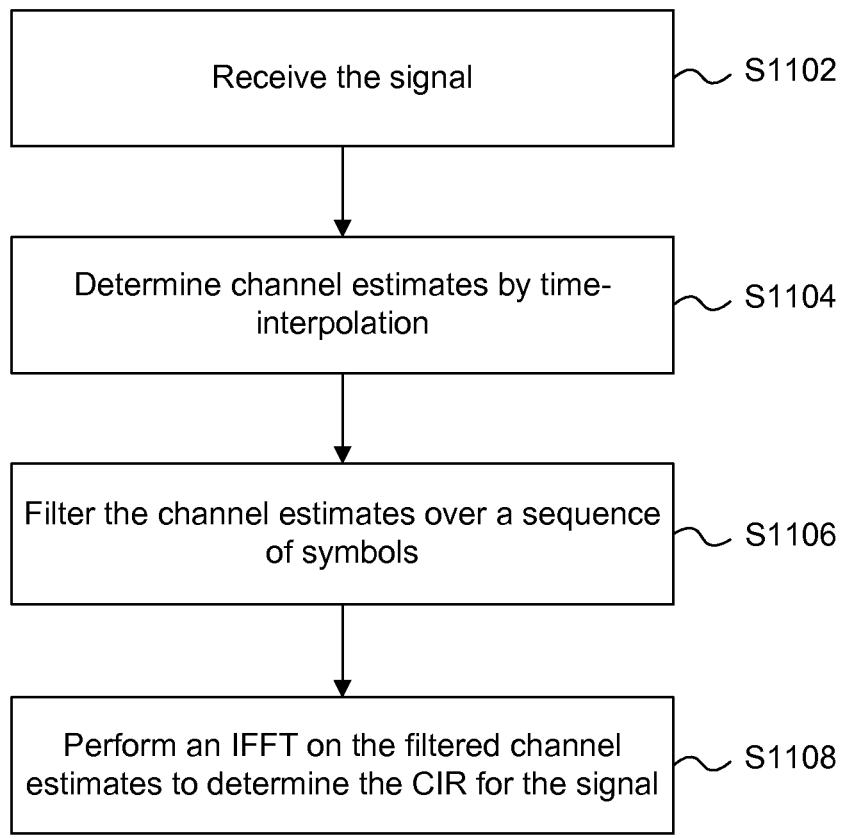
FIG. 11 shows a flow chart for a method of processing a signal to determine a CIR for the signal in the second example.

The operation of the CIR block 106 shown in FIG. 10 is described with reference to the flow chart shown in FIG. 11. In step S1102 the receive module 104 receives the signal over a channel. The received signal is processed by the FFT block 108 and is optionally processed by the descrambler module 501 in the same way as described above in relation to FIGS. 5 and 6. In step S1104 the interpolation module 502 determines channel estimates (i.e. virtual pilot signals) as described above in relation to step S604. However, in step S1106 the channel estimates (e.g. both actual and virtual pilot signals) are received at the filter module 1006 and the channel estimates are filtered over a sequence of the symbols to attenuate components which vary with particular frequencies (corresponding to spurious components) over the sequence of symbols. In this way, in step S1106 the filter module 1006 determines a set of filtered channel estimates for a respective set of the subcarriers. In other words, filtering may be applied for each frequency subcarrier over a plurality of symbols (e.g. with reference to FIG. 7, over a vertical line of channel estimates), to thereby determine a filtered channel estimate for each of the frequency subcarriers which is filtered over a plurality of symbols (i.e. filtered over time). The filtered coefficients for the respective frequency subcarriers represent a set of filtered channel estimates.

The filtering in step S1106 can be applied using corresponding principles to those described above in relation to the filtering of step S608. For example, the filtering may comprise low-pass filtering of the channel estimates. Furthermore, the filter 1012 may be an integrate and dump filter. In this way, the filtering in step S1106 may comprise integrating the channel estimates (for a subcarrier) over a number of symbols, wherein the number of symbols over which the channel estimates are integrated is equal to a positive integer multiplied by the number of different patterns of channel estimate phases (i.e. pilot signal phases) in the symbols.

As described above, the particular frequencies may be identified by determining the frequencies at which spurious components are likely to occur based on the pilot transmission scheme. The control module 1014 controls the filtering applied by the filter 1012 such that components of the channel estimates which vary with the identified particular frequencies over the sequence symbols are attenuated. Furthermore, as described above, the sequence of symbols over which the channel estimates are filtered may include a set of consecutive symbols in the received signal, or may include some but not all of a set of consecutive symbols in the received signal (e.g. 8 symbols from a block of 32 consecutive symbols).

In step S1108 the IFFT module 1004 performs an inverse Fourier transform on the set of filtered channel estimates output from the filter module 1006, thereby determining the channel impulse response for the signal.

In both the examples shown in FIGS. 5 and 10, the processing block (503 or 1003) determines the CIR for the signal using a plurality of the channel estimates received from the interpolation module 502, by performing at least one inverse Fourier transform and applying filtering, such that components of the CIR for the signal which vary over time with particular frequencies are attenuated. The order of applying the inverse Fourier transform and the filtering is different in different examples described herein, but all of the examples achieve the result of attenuating the spurious components from the CIR determined for the signal by filtering.

Generally, any of the functions, methods, techniques or components described above can be implemented in modules using software, firmware, hardware (e.g., fixed logic circuitry), or any combination of these implementations. The terms "module," "functionality," "component", "block" and "logic" are used herein to generally represent software, firmware, hardware, or any combination thereof.

In the case of a software implementation, the module, functionality, component, block or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors. That is, there may be provided a computer program product configured to process the received signal to determine the CIR for the signal, wherein the computer program product is embodied on a computer-readable storage medium and configured so as when executed on a processor at the receiver 102 to perform any of the methods described herein.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, block or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of processing a signal to determine a channel impulse response for the signal, the signal adhering to a frequency-division multiplexing scheme in which the signal comprises a plurality of symbols, each of the symbols comprising a plurality of distinct data slots for transmitting data using a respective plurality of subcarriers which are distinct in the frequency domain, wherein pilot signals are applied to data slots of at least some different symbols using different subcarriers in accordance with a pilot transmission scheme, the method comprising:
receiving the signal over a channel, wherein the pilot signals in the received signal are indicative of channel estimates for the data slots of the received signal which include the pilot signals;
for at least some of the data slots of the received signal which do not include a pilot signal, determining channel estimates by time-interpolation of received pilot signals in other data slots of the received signal; and
determining a channel impulse response for the signal using a plurality of the channel estimates, by:
performing at least one inverse Fourier transform on said plurality of channel estimates to determine a sequence of estimated channel impulse responses for a sequence of symbols, and
filtering the sequence of estimated channel impulse responses to attenuate components of the sequence of estimated channel impulse responses which vary with identified particular frequencies over the sequence of estimated channel impulse responses, wherein the particular frequencies are identified so as to correspond to frequencies with which spurious components vary over time, said spurious components being peaks which occur in the channel impulse response for the signal due to imperfections in said determination of channel estimates by time interpolation.

2. The method of claim 1 wherein a respective inverse Fourier transform is performed for each symbol of the sequence of symbols on the channel estimates for a plurality of the data slots of that symbol, thereby determining the sequence of estimated channel impulse responses for the sequence of symbols.

3. The method of claim 1 wherein each of the estimated channel impulse responses comprises values at a plurality of bin positions, and wherein the method further comprises:
for each of a plurality of the bin positions of the estimated channel impulse responses, performing a Fourier transform over the sequence of estimated channel impulse responses; and
analysing the results of the Fourier transform to identify said particular frequencies by finding peaks in the results of the Fourier transform corresponding to components which vary over the estimated channel impulse responses at frequencies which are indicative of spurious components.

4. The method of claim 1 further comprising identifying said particular frequencies by determining frequencies at which spurious components are likely to occur based on the pilot transmission scheme.

5. The method of claim 3 further comprising controlling said filtering of the sequence of estimated channel impulse responses to attenuate components which vary with said identified particular frequencies over the sequence of estimated channel impulse responses.

6. The method of claim 1 wherein the pilot signals are applied to data slots of the symbols in a regular repeating pattern across the different subcarriers in accordance with the pilot transmission scheme, thereby setting a number of different patterns of channel estimate phases in the symbols, wherein the regular repeating pattern is a diagonal repeating pattern across the different subcarriers of the symbols in the signal.

7. The method of claim 6 wherein said filtering comprises integrating a number of the estimated channel impulse responses, said number of integrated estimated channel impulse responses being equal to a positive integer multiplied by the number of different patterns of channel estimate phases in the symbols.

8. The method of claim 1 wherein said sequence of symbols for which estimated channel impulse responses are determined includes either (i) a set of consecutive symbols in the received signal, or (ii) some but not all of a set of consecutive symbols in the received signal.

9. A receiver configured to process a signal to determine a channel impulse response for the signal, the signal adhering to a frequency-division multiplexing scheme in which the signal comprises a plurality of symbols, each of the symbols comprising a plurality of distinct data slots for transmitting data using a respective plurality of subcarriers which are distinct in the frequency domain, wherein pilot signals are applied to data slots of at least some different symbols using different subcarriers in accordance with a pilot transmission scheme, the receiver comprising:
a receive module configured to receive the signal over a channel, wherein the pilot signals in the received signal are indicative of channel estimates for the data slots of the received signal which include the pilot signals;
an interpolation module configured to determine channel estimates for at least some of the data slots of the received signal which do not include a pilot signal, by time-interpolation of received pilot signals in other data slots of the received signal; and
a processing block configured to determine a channel impulse response for the signal using a plurality of the channel estimates, the processing block comprising:
an inverse Fourier transform module configured to perform at least one inverse Fourier transform on said plurality of channel estimates to determine a sequence of estimated channel impulse responses for a sequence of symbols, and
a filter module configured to filter the sequence of estimated channel impulse responses to attenuate components which vary with identified particular frequencies over the sequence of estimated channel impulse responses, wherein the particular frequencies are identified so as to correspond to frequencies with which spurious components vary over time, said spurious components being peaks which are created in the channel impulse response for the signal by imperfections in the time-interpolation of the interpolation module.

10. The receiver of claim 9 wherein the inverse Fourier transform module is configured to perform a respective inverse Fourier transform on the channel estimates for a plurality of the data slots of each symbol of a sequence of the symbols, to thereby determine the sequence of estimated channel impulse responses.

11. The receiver of claim 9 wherein the filter module is configured to filter the plurality of the channel estimates over a sequence of the symbols to attenuate components which vary with particular frequencies over the sequence of symbols, thereby determining a set of filtered channel estimates for a respective set of the subcarriers; and wherein the inverse Fourier transform module is configured to perform an inverse Fourier transform on the set of filtered channel estimates, thereby determining the channel impulse response for the signal.

12. The receiver of claim 9 further comprising a Fast Fourier Transform block configured to sample the symbols of the received signal, wherein the Fast Fourier Transform block is configured to use the determined channel impulse response for the signal to position a Fast Fourier Transform window for sampling the symbols of the received signal.

13. The receiver of claim 12 wherein the Fast Fourier Transform block is configured to:
use the determined channel impulse response for the signal to estimate inter-symbol interference as a function of the position of the Fast Fourier Transform window; and
determine the position of the Fast Fourier Transform window which corresponds to the minimum inter-symbol interference based on the estimate of the inter-symbol interference.

14. A receiver configured to process a signal to determine a channel impulse response for the signal, the signal adhering to a frequency-division multiplexing scheme in which the signal comprises a plurality of symbols, each of the symbols comprising a plurality of distinct data slots for transmitting data using a respective plurality of subcarriers which are distinct in the frequency domain, wherein pilot signals are applied to data slots of at least some different symbols using different subcarriers in accordance with a pilot transmission scheme, the receiver comprising:
a receive module configured to receive the signal over a channel, wherein the pilot signals in the received signal are indicative of channel estimates for the data slots of the received signal which include the pilot signals;
an interpolation module configured to determine channel estimates for at least some of the data slots of the received signal which do not include a pilot signal, by time-interpolation of received pilot signals in other data slots of the received signal; and
a processing block configured to determine a channel impulse response for the signal using a plurality of the channel estimates, the processing block comprising:
a filter module configured to filter the plurality of the channel estimates over a sequence of the symbols to attenuate components which vary with particular frequencies over the sequence of symbols, thereby determining a set of filtered channel estimates for a respective set of the subcarriers, and
an inverse Fourier transform module configured to perform an inverse Fourier transform on the set of filtered channel estimates;
wherein the particular frequencies correspond to frequencies with which spurious components vary over time, said spurious components being peaks which are created in the channel impulse response for the signal by imperfections in the time-interpolation of the interpolation module.

15. The receiver of claim 14, wherein the filter module is configured to identify said particular frequencies by determining frequencies at which spurious components are likely to occur based on the pilot transmission scheme, wherein the filter module comprises a control module configured to control said filtering of the plurality of the channel estimates to attenuate components which vary with said identified particular frequencies over the sequence symbols.

16. The receiver of claim 14, wherein the pilot signals are applied to data slots of the symbols in a regular repeating pattern across the different subcarriers in accordance with the pilot transmission scheme, thereby setting a number of different patterns of channel estimate phases in the symbols, wherein the regular repeating pattern is a diagonal repeating pattern across the different subcarriers of the symbols in the signal.

17. The receiver of claim 16, wherein the filter module is configured to filter the plurality of the channel estimates by integrating the channel estimates over a number of symbols, said number of symbols over which the channel estimates are integrated being equal to a positive integer multiplied by the number of different patterns of channel estimate phases in the symbols.

18. The receiver of claim 14, wherein said sequence of symbols over which the channel estimates are filtered includes either (i) a set of consecutive symbols in the received signal, or (ii) some but not all of a set of consecutive symbols in the received signal.

* * * * *